United States Patent [19]
Buzbee et al.

[11] Patent Number: 5,140,614
[45] Date of Patent: Aug. 18, 1992

[54] METHOD AND APPARATUS FOR DETECTING DIGITAL CARRIER SIGNALS ON TELEPHONE CABLES

[75] Inventors: James M. Buzbee; Douglas R. Connally, both of Mineral Wells, Tex.

[73] Assignee: Industrial Technology, Inc., Mineral Wells, Tex.

[21] Appl. No.: 635,294

[22] Filed: Dec. 28, 1990

[51] Int. Cl.⁵ .................................. H04L 27/22
[52] U.S. Cl. ........................ 375/75; 455/164.1
[58] Field of Search ............... 375/75, 77, 94; 455/41, 455/55, 164; 379/52, 96; 340/711

[56] References Cited

U.S. PATENT DOCUMENTS

| | | | |
|---|---|---|---|
| 3,311,828 | 3/1967 | Chasek | 375/77 |
| 3,609,247 | 9/1971 | Halstead | 455/51 |
| 3,882,272 | 5/1975 | Norian | 375/99 |
| 4,006,315 | 2/1977 | Halstead | 455/41 |
| 4,868,887 | 9/1989 | Bertrand | 455/41 |

*Primary Examiner*—Stephen Chin
*Attorney, Agent, or Firm*—Geoffrey A. Mantooth

[57] ABSTRACT

The apparatus has a probe for collecting a small portion of a carrier signal on a pair of wires. The collected portion of the carrier signal is mixed with a local oscillator signal so as to produce a heterodyned signal having a low frequency component and a high frequency component. The frequency of the local oscillator signal is selected to be within a few Kilohertz of the carrier signal so that the low frequency component is within an audible range. A low pass filter removes the high frequency component. The low frequency component is amplified and converted to sound. The audible signal is a representation of the carrier signal and allows a technician to determine the relative strength of the carrier signal and to identify the type of carrier signal on the wire pair.

16 Claims, 1 Drawing Sheet

METHOD AND APPARATUS FOR DETECTING DIGITAL CARRIER SIGNALS ON TELEPHONE CABLES

FIELD OF THE INVENTION

The present invention relates to methods and apparatuses for detecting digital signals on telephone cables.

BACKGROUND OF THE INVENTION

Telephone systems in general use both copper wires and optical fibers to carry telephone signals. Much of the physical equipment already in place is copper wire and its associated equipment. Traditionally, a pair of copper wires was used to carry only a single conversation. Nowadays a single pair of copper wires can carry multiple conversations by way of multiplexing. Multiplexing increases the capacity of the telephone system by allowing the system to carry more calls. One type of multiplexing uses a digital carrier signal. The audio information is digitized and sent over the wires on the digital carrier. Examples of standard digital carriers that have been adopted by the telephone industry are T-1 and T-2. These are pulse code modulation carriers.

Field technicians working on a telephone cable of copper wire must frequently locate those particular copper wires in the cable bundle that have carrier signals on them. The field technician may be tracing a particular pair of wires or he may be attempting to locate an unused pair, that is a pair without a carrier signal thereon, in the cable. He can then use this unused pair to communicate with other technicians along the cable.

At voice frequencies, where a pair of copper wires carries only a single conversation, the technician can use simple test equipment to detect a pair that is in service. The test equipment may either capacitively or conductively load the wire pair. At voice frequencies (about 200-3200 Hz), this is acceptable because there is little or no degradation of service. However, at the higher frequencies used by digital carriers (772 KHz on up), such loading by test equipment can cause degradation and interruption of telephone services on the wire pair. Thus, some type of non-invasive equipment must be used when testing a pair of wires to determine the presence or absence of a digital carrier.

In the prior art of which we are aware, there is a non-invasive apparatus for detecting digital carriers. The prior art apparatus uses inductive or capacitive coupling to obtain a signal from the wire pair. The signal is filtered so as to pass only carrier frequencies. The signal is then amplified and detected. When the signal exceeds a certain threshold, it sounds a buzzer, thereby indicating the presence of a carrier.

The prior art apparatus suffers from the disadvantages of being unable to provide information on relative carrier signal strength and on carrier identity. Relative carrier signal strength is useful to determine if the carrier signal that is detected on a particular pair of wires is due to the pair actually being in service or instead is due to only a crosstalk signal that has been coupled to the pair that is being probed. Determination of carrier identity is useful in tracing lines through the local network and in particular in the central office.

SUMMARY OF THE INVENTION

It is an object of the present invention to provide an apparatus and method for detecting digital carriers in a telephone cable, which method and apparatus provides an indication of the relative strength of the carrier.

It is another object of the present invention to provide an apparatus and method for detecting digital carriers in a telephone cable, which method and apparatus provide an indication of the identity of the carrier signal.

Still another object of the present invention is to provide a method and apparatus for detecting digital carriers on a telephone cable non-invasively so that the telephone service carried by the cable is not interrupted or degraded during detection.

The apparatus of the present invention detects a digital carrier signal on conductors. The carrier signal has a principal frequency. The apparatus includes sensor means, heterodyning means and output means. The sensor means is for coupling a portion of the carrier signal on the conductors to the apparatus. The sensor means has a high impedance so that the carrier signal on the conductors will not be disrupted. The sensor means is removably couplable to the conductors. The heterodyning means is for mixing the carrier signal as sensed by the sensor means with a local signal so as to produce a low frequency signal and a high frequency signal. The heterodyning means includes a local oscillator means that produces the local signal. The local signal is within a few kilohertz of the carrier signal principle frequency so that the low frequency signal is within a range that is detectable by a human being. The heterodyning means has an input that is connected to the sensor means. The output means provides an output signal that is detectable by a human being and that is representative of the low frequency signal. The output means is connected with an output of the heterodyning means, wherein the output signal is representative of the detected carrier signal and allows a determination of the relative strength and identity of the detected carrier signal.

In one aspect, the heterodyning means includes plural local oscillator means, with each of the local oscillator means producing a respective local signal that is within a few kilohertz of a predetermined type of carrier signal, wherein the apparatus can be used to detect plural types of carrier signals. In another aspect, the heterodyning means includes switch means for allowing a selected one of the local signals from a selected one of the local oscillator means to be mixed with the sensed carrier signal, wherein the switch means allows the identification of the type of detected carrier signal.

In another aspect, the sensor means comprises a capacitive probe that includes two conductive plates. The plates are separated from each other by a layer of insulating material. The capacitive probe is thin so as to allow the insertion of the plates between a pair of conductors. The input of the heterodyning means to which the capacitive probe is connected is a balanced differential input.

The method of the present invention detects a digital carrier signal on a pair of conductors. A portion of the carrier signal is collected from the pair. The collected portion of the carrier signal is heterodyned with a local oscillator signal so as to produce a low frequency signal. The local oscillator signal is within a few kilohertz of the carrier signal such that the low frequency signal is within an audible range. An audible signal that is detectable by a human being is produced from the low frequency signal, wherein the audible signal is a representation of the carrier signal.

With the apparatus and method of the present invention, a technician can probe pairs of wires in a cable bundle, searching for those pairs that are in service due to their carrying digital carrier signals. The apparatus and method provides an audible representation of the digital carrier signal, allowing a technician to determine the relative strength and the identity of the digital carrier signal. The relative strength is used to determine if the pair being probed is actually in service or merely carries a crosstalk coupled signal. The capacitive probe further enhances discrimination between coupled and uncoupled signals, by enhancing uncoupled (and desired) signals, while tending to cancel coupled signals. The technician can listen to the audible representation and by its relative strength, its pitch and its modulation, can determine if the pair being probed is in service and the identity of the carrier thereon.

DESCRIPTION OF THE PREFERRED EMBODIMENT

Figure 1:
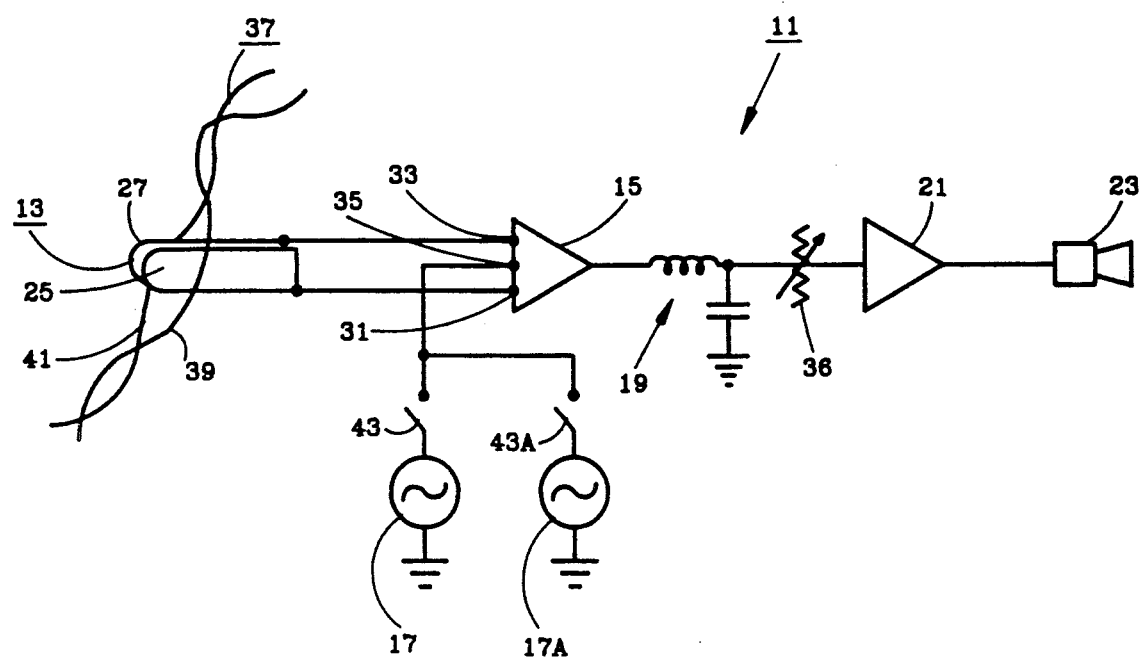
FIG. 1 is an electrical schematic diagram of the apparatus of the present invention, in accordance with a preferred embodiment.

In FIG. 1, there is shown an electrical schematic diagram of the probe apparatus 11 of the present invention, in accordance with a preferred embodiment. The probe apparatus 11 is used by telephone technicians to locate those pairs of conductors in a telephone cable that are in communication service by virtue of their carrying a digital carrier signal. The probe apparatus 11 enables a technician to distinguish between a wire pair that is in service and a wire pair that is not in service, even though the out of service pair may carry a digital carrier signal as a result of crosstalk.

The probe apparatus 11 includes a sensing probe 13, a mixer 15, a local oscillator 17, a low pass filter 19, an amplifier 21 and a speaker 23.

The sensing probe 13 is a balanced capacitive probe. The probe 13 is made up of two conductive plates 25, 27 that are separated from each other by a layer of insulating material 29. In the preferred embodiment, the probe 13 is incorporated into a printed circuit board. The probe insulating material 29 is the printed circuit board insulating material. The probe conductive plates 25, 27 are formed by conductors on each side of the printed circuit board.

Figure 2:
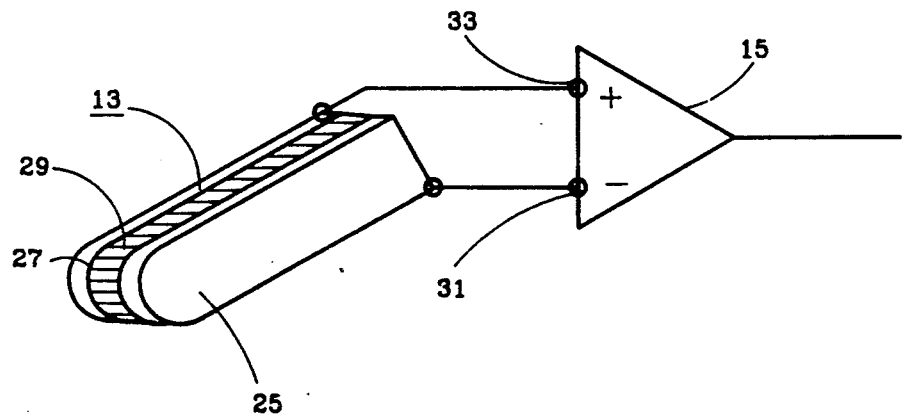
FIG. 2 is a schematic diagram showing in detail the capacitive probe.

Each of the conductive plates 25, 27 of the capacitive probe 13 is connected to an input 31, 33 of the balanced mixer 15. One plate 25 is connected to the inverting input 31 while the other plate 27 is connected to the non-inverting input 33 of the mixer amplifier (see FIG. 2). The local oscillator 17 is connected to a third input 35 of the mixer 15. The local oscillator 17 produces a signal that is within a few kilohertz of a principal frequency (or fractions or multiples thereof) of the digital carrier. For example, a T-1 carrier signal utilizes 1.544 megabits per second. However, because a T-1 carrier signal utilizes bipolar pulses, the bandwidth is reduced to 772 KHz, or one half of 1.544. Thus, the fundamental or principal frequency of a T-1 carrier signal is 772 KHz. In the preferred embodiment, the local oscillator 17 produces a 771 KHz signal. The output of the mixer 15 is connected to an input of the low pass filter 19. The output of the low pass filter 19 is connected to the input of the amplifier 21. A sensitivity control in the form of a potentiometer 36 is connected to the input of the amplifier 21. The output of the amplifier 21 is connected to the speaker 23.

To use the probe apparatus of the present invention, the technician selects the pair 37 of wires to be tested and inserts the capacitive probe 13 between the tip and ring conductors 39, 41 of the selected wire pair. The mixer 15 heterodynes the carrier signal as detected by the probe 13 with the local oscillator 17 signal to produce a heterodyne signal having a low frequency component (about 1 KHz for a T-1 carrier) and a high frequency component (which is greater than 1 MHz for a T-1 carrier). The low frequency component is located within the audible range because the local oscillator 17 produces a signal within several kilohertz of the digital carrier fundamental frequency. The low pass filter 19 passes the low frequency component while filtering out the high frequency component. The amplifier 21 amplifies the low frequency component, which is converted to sound by the speaker 23 so as to be heard by the technician.

With the apparatus 11 of the present invention, the technician is able to determine both the relative strength and the identity of the carrier on a wire pair 37. This is because the apparatus 11 provides an audible representation of the carrier signal that is indicative of these parameters.

The relative strength of the carrier signal can be determined by listening to the loudness of the audible representation. The loudness of the audible representation increases as the strength of the detected carrier signal increases. The loudness indicates if the pair of wires being probed is actually in service and is thus carrying a carrier signal, or instead if the carrier signal is appearing on the pair as the result of crosstalk coupling. A faint audible representation indicates that the detected carrier on the pair being probed is produced by crosstalk coupling, while the loudest audible representation indicates that the pair being probed is in service. By moving the capacitive probe from wire pair to wire pair and listening to the relative loudness of the respective audible representations, the technician can locate those pairs that are in service and distinguish the in-service pair from the out-of-service pairs.

The capacitive probe 13 of the present invention enhances the discrimination between a wire pair actually in service and carrying a carrier signal and a wire pair carrying a carrier signal that has been coupled to it by crosstalk. When the probe 13 is inserted between tip and ring conductors, a voltage divider is formed by the capacitance between the tip conductor 39 and the closest probe conductor 25, between the two probe conductors 25, 27 and between the ring conductor 41 and the closest probe conductor 27. If the pair being probed is actually carrying a carrier signal, then the voltage and current on the pair has a 180 degrees phase difference between the wires 39, 41. The out of phase signals are sent to the balanced differential inputs 31, 33 of the mixer 15, wherein they reinforce and are thus more easily detectable. If the pair being probed carries a crosstalk coupled signal, then the current and voltage are in phase between the wires 39, 41. The in phase signals tend to cancel making detection more difficult. Therefore, valid signals from in service wires are better detected than are crosstalk signals.

The identity of the carrier is useful to know when the technician is tracing a line. The identity of the detected carrier can be determined by listening to the relative pitch and modulation of the audible representation. Thus, for example, a T-1 type of carrier will have a lower relative pitch than a T-2 type of carrier, which utilizes a higher principal frequency than a T-1 carrier.

The probe apparatus can be used to detect several types of carriers, all having different principal frequencies. For example, T-1, T-1C, and T-2 carriers utilize fundamental frequencies that are all multiples of 772 KHz. Therefore, a single local oscillator 17 can be used to detect these carriers. The local oscillator 17 produces harmonics of its fundamental frequency of 771 KHz. These harmonics are heterodyned with the fundamental frequencies of the T-1C and T-2 carrier signals to produce heterodyne signals that have higher frequencies (and higher pitch as perceived by a human ear) than the heterodyne signals from a T-1 carrier.

For unrelated carriers, such as 2 MHz and ISDN, a local oscillator 17, 17A is provided for each carrier as shown in FIG. 1. Each local oscillator 17, 17A produces a signal within a few kilohertz of its respective carrier signal principal frequency. The local oscillator 17 is used to detect a 2 MHz carrier, while the local oscillator 17A is used to detect an ISDN carrier. Switches 43, 43A are used to connect individual local oscillators 17, 17A into the input 35 of the mixer 15. The switches 43, 43A can both be closed at the same time to allow a technician to detect a carrier signal. Once a signal is detected, the switches 43, 43A can be selectively opened, one at a time so as to produce only a single local oscillator signal. This allows the technician to identify the type of carrier signal that has been detected.

The capacitive probe 13 is easy to use, requiring a technician to only insert it between the tip and ring conductors of a wire pair. The capacitive probe 13 is also selective. When the probe 13 is inserted between a wire pair, it is relatively immune to signals from adjacent wire pairs.

Although the apparatus has been described as using a capacitive probe, other types of probes could be used. For example, a conventional inductive probe could be used. The high impedance probe collects small amounts of energy from the signal on the wire pair without disrupting the carrier signal.

Although the apparatus of the present invention has been described as producing an audible representation of the carrier signal, other types of representations, which are perceivable by a human being, could be used. For example, visual amplitude indicators could be used in lieu of the speaker. Such visual indicators would include analog or digital meters or bar graphs.

The foregoing disclosure and the showings made in the drawings are merely illustrative of the principles of this invention and are not to be interpreted in a limiting sense.

We claim:

1. An apparatus for detecting a digital carrier signal on conductors, said carrier signal having a principal frequency, comprising:
   a) sensor means for coupling a portion of said carrier signal on said conductors to said apparatus, said sensor means having a high impedance so that said carrier signal on said conductors will not be disrupted, said sensor means being removably couplable to said conductors;
   b) heterodyning means for mixing said carrier signal as sensed by said sensor means with a local signal so as to produce a low frequency signal and a high frequency signal, said heterodyning means comprising a local oscillator means that produces said local signal, said local signal being within a few kilohertz of said carrier signal principal frequency such that said low frequency signal is within a range that is detectable by a human being, said heterodyning means having an input that is connected to said sensor means;
   c) output means for providing an output signal that is detectably by a human being and that is representative of said low frequency signal, said output means being connected with an output of said heterodyning means, wherein said output signal is representative of said detected carrier signal and allows a determination of the relative strength and identity of said detected carrier signal;
   d) said heterodyning means comprising plural local oscillator means, with each of said local oscillator means producing a respective local signal that is within a few kilohertz of a predetermined type of carrier signal, wherein said apparatus can be used to detect plural types of carrier signals.

2. The apparatus of claim 1 wherein said sensor means comprises a capacitive probe that comprises two conductive plates; said plates being separated from each other by a layer of insulating material, said capacitive probe being thin so as to allow the insertion of said plates between a pair of conductors, said input of said heterodyning means to which said capacitive probe is connected being a balanced differential input.

3. The apparatus of claim 1 wherein said heterodyning means comprises switch means for allowing a selected one of said local signals from a selected one of said local oscillator means to be mixed with said sensed carrier signal, wherein said switch means allows the identification of the type of detected carrier signal.

4. An apparatus for detecting a digital carrier signal on conductors, said carrier signal having a principal frequency, comprising:
   a) sensor means for coupling a portion of said carrier signal on said conductors to said apparatus, said sensor means having a high impedance so that said carrier signal on said conductors will not be disrupted, said sensor means being removably coupled to said conductors;
   b) heterodyning means for mixing said carrier signal as sensed by said sensor means with a local signal so as to produce a low frequency signal and a high frequency signal, said heterodyning means comprising a local oscillator means that produces said local signal, said local signal being within a few kilohertz of said carrier signal principal frequency such that is detectable by a human being, said heterodyning means having an input that is connected to said sensor means;
   c) output means for providing an output signal that is detectable by a human being and that is representative of said low frequency signal, said output means being connected with an output of said heterodyning means, wherein said output signal is representative of said detected carrier signal and allows a determination of the relative strength and identity of said detected carrier signal;
   d) said sensor means comprising a capacitive probe that comprises two conductive plates; said plates being separated from each other by a layer of insulating material, said capacitive probe being thin so as to allow the insertion of said plates between a pair of conductors, said input of said heterodyning means to which said capacitive probe is connected being a balanced differential input.

5. An apparatus for detecting a digital carrier signal on conductors, said carrier signal having a principal frequency, comprising:
   a) sensor means for coupling energy from said conductors, said sensor means having a high impedance;
   b) oscillator means for producing a signal that is close in frequency to said carrier signal principal frequency such that when said oscillator means signal is mixed with said carrier signal a low frequency signal is produced that is within an audible range;
   c) mixing means for mixing said carrier signal with said oscillator means signal so as to produce said low frequency signal within said audible range, said mixing means having a first input that is connected with said sensor means and a second input that is connected with said oscillator means;
   d) filter means for passing said low frequency signal and rejecting higher frequency signals, said filter means being connected with an output of said mixing means;
   e) amplifier means for amplifying said low frequency signal, said amplifier means having an input that is connected with said filter means;
   f) speaker means responsive to said low frequency signal, said speaker means being connected to an output of said amplifier means;
   g) said sensor means comprising a capacitive probe that comprises two conductive plates, said plates being separated from each other by a layer of insulating material, said capacitive probe being thin so as to allow the insertion of said plates between a pair of said conductors, said input of said mixing means to which said capacitive probe is connected being a balanced differential input.

6. The apparatus of claim 5 further comprising sensitivity control means for controlling the sensitivity of the apparatus in detecting said carrier, said sensitivity control means being connected to said amplifier means input.

7. An apparatus for detecting a digital carrier signal on conductors, said carrier signal having a principal frequency, comprising:
   a) sensor means for coupling a portion of said carrier signal on said conductors to said apparatus, said sensor means comprising a balanced capacitive probe that is thin so as to allow insertion of the probe between a pair of said conductors;
   b) heterodyning means for mixing said carrier signal as sensed by said sensor means with a local signal so as to produce a low frequency signal and a high frequency signal, said heterodyning means comprising a local oscillator means that produces said local signal, said local signal being within a few kilohertz of said carrier signal principal frequency such that said low frequency signal is within a range that is detectable by a human being, said heterodyning means having a balanced input that is connected to said probe;
   c) output means for providing an output signal that is detectable by a human being and that is representative of said low frequency signal, said output means being connected with an output of said heterodyning means, wherein said output signal is representative of a detected carrier signal and allows a determination of the relative strength and identity of said detected carrier signal.

8. An apparatus for detecting a digital carrier signal on conductors, said carrier signal having a principal frequency, comprising:
   a) sensor means for coupling energy from said conductors, said sensor means having a high impedance;
   b) oscillator means for producing a signal that is close in frequency to said carrier signal principal frequency such that when said oscillator means signal is mixed with said carrier signal a low frequency signal is produced that is within an audible range;
   c) mixing means for mixing said carrier signal with said oscillator means signal so as to produce said low frequency signal within said audible range, said mixing means having a first input that is connected with said sensor means and a second input that is connected with said oscillator means;
   d) filter means for passing said low frequency signal and rejecting higher frequency signals, said filter means being connected with an output of said mixing means;
   e) amplifier means for amplifying said low frequency signal, said amplifier means having an input that is connected with said filter means;
   f) speaker means responsive to said low frequency signal, said speaker means being connected to an output of said amplifier means;
   g) said heterodyning means comprising plural local oscillator means, with each of said local oscillator means producing a respective local signal that is within a few kilohertz of a predetermined type of carrier signal, said heterodyning means comprising switch means for allowing a selected one of said local signals from a selected one of said local oscillator means to be mixed with said sensed carrier signal, wherein said apparatus can be used to detect plural types of carrier signals.

9. The apparatus of claim 8 further comprising:
   a) sensitivity control means for controlling the sensitivity of the apparatus in detecting said carrier, said sensitivity control means being connected to said amplifier means input;
   b) said sensor means comprising a capacitive probe that comprises two conductive plates, said plates being separated from each other by a layer of insulating material, said capacitive probe being thin so as to allow the insertion of said plates between a pair of said conductors, said input of said mixing means to which said capacitive probe is connected being a balanced differential input.

10. The apparatus of claim 8 wherein said sensor means comprises a capacitive probe that comprises two conductive plates; said plates being separated from each other by a layer of insulating material, said capacitive probe being thin so as to allow the insertion of said plates between a pair of conductors, said input of said heterodyning means to which said capacitive probe is connected being a balanced differential input.

11. A method of detecting a digital carrier signal on a pair of conductors, comprising the steps of:
   a) collecting a portion of said carrier signal from said pair;
   b) providing plural local oscillator signals, with each of said plural local oscillator signals begin within a few kilohertz of a respective predetermined type of carrier signal;

c) detecting said carrier signal by heterodyning said collected portion of said carrier signal with said local oscillator signals so as to produce a low frequency signal;

d) producing a detectable signal from said low frequency signal that is detectable by a human being, wherein the type of said carrier signal can be identified.

12. The method of claim 11 wherein said low frequency signal is produced by filtering the resultant signal of said heterodyning step so as to reject high frequency components and pass low frequency components within said audible range.

13. The method of claim 12 further comprising the step of amplifying said low frequency signal so as to drive a speaker.

14. The method of claim 11 further comprising the steps of providing balanced capacitor probe means and collecting said carrier signal portion with said probe means.

15. A method of detecting a digital carrier on a pair of conductors, comprising the steps of:

a) providing balanced capacitor probe means;

b) inserting said probe means between the conductors in said pair;

c) collecting a portion of said carrier signal from said pair;

d) mixing said collected portion of said carrier signal with a local oscillator signal so as to produce a low frequency signal that is within a range that is detectable by a human being;

e) producing a detectable signal from said low frequency signal, said detectable signal being detectable by a human being.

16. The method of claim 15 wherein said low frequency signal is within an audible range, and producing an audible signal from said low frequency signal.

* * * * *